United States Patent
Aminaka

(10) Patent No.: US 10,505,621 B2
(45) Date of Patent: Dec. 10, 2019

(54) RELAY RADIO TERMINAL, CORE NETWORK APPARATUS, AND METHOD THEREFOR

(71) Applicant: NEC Corporation, Tokyo (JP)

(72) Inventor: Hiroaki Aminaka, Tokyo (JP)

(73) Assignee: NEC Corporation, Tokyo (JP)

( * ) Notice: Subject to any disclaimer, the term of this patent is extended or adjusted under 35 U.S.C. 154(b) by 256 days.

(21) Appl. No.: 15/515,708

(22) PCT Filed: Jul. 15, 2015

(86) PCT No.: PCT/JP2015/003574
§ 371 (c)(1),
(2) Date: Mar. 30, 2017

(87) PCT Pub. No.: WO2016/056154
PCT Pub. Date: Apr. 14, 2016

(65) Prior Publication Data
US 2017/0302360 A1    Oct. 19, 2017

(30) Foreign Application Priority Data

Oct. 7, 2014  (JP) ................................. 2014-206189

(51) Int. Cl.
*H04B 7/15*        (2006.01)
*H04W 80/02*   (2009.01)
(Continued)

(52) U.S. Cl.
CPC ........ *H04B 7/15542* (2013.01); *H04W 80/02* (2013.01); *H04W 88/04* (2013.01); *H04W 92/04* (2013.01); *H04W 88/16* (2013.01)

(58) Field of Classification Search
None
See application file for complete search history.

(56) References Cited

U.S. PATENT DOCUMENTS

| 8,270,361 B2* | 9/2012 | Yi | H04W 72/087 |
| | | | 370/329 |
| 2007/0005803 A1* | 1/2007 | Saifullah | H04W 36/0022 |
| | | | 709/245 |

(Continued)

FOREIGN PATENT DOCUMENTS

| CN | 102098725 A | 6/2011 |
| CN | 102388578 A | 3/2012 |
| CN | 104066200 A | 9/2014 |

OTHER PUBLICATIONS

Korean Notice of Preliminary Rejection issued in Korean Patent Application No. 10-2017-7008330, dated Feb. 19, 2018, 11 pages.

(Continued)

*Primary Examiner* — Xavier Szewai Wong
(74) *Attorney, Agent, or Firm* — Wilmer Cutler Pickering Hale and Dorr LLP

(57) ABSTRACT

A relay radio terminal (1) is configured to: (a) establish a first radio bearer (300) containing a data radio bearer (301) between the relay radio terminal (1) and a base station (3) and also containing a first GTP tunnel (302) between the base station (3) and a core network (4); (b) establish a second GTP tunnel (320) passing through the first bearer (300); (c) receive or transmit a second packet (501) destined for, or originating from, a remote radio terminal (2) in the second GTP tunnel (320) passing through the first bearer (300); and (d) transmit or receive a second user packet (501) to or from the remote radio terminal (2) via Proximity Service (ProSe) communication. This contributes to achievement of a user-plane architecture suitable for a scenario in which a remote radio terminal communicates with an external network through an inter-terminal direct communication path with a relay radio terminal.

12 Claims, 12 Drawing Sheets

(51) Int. Cl.
   *H04W 88/04*   (2009.01)
   *H04W 92/04*   (2009.01)
   *H04B 7/155*   (2006.01)
   *H04W 88/16*   (2009.01)

(56) References Cited

U.S. PATENT DOCUMENTS

| | | | | |
|---|---|---|---|---|
| 2011/0019617 A1* | 1/2011 | Ho | ........................ | H04W 28/06 370/328 |
| 2011/0103294 A1* | 5/2011 | Liu | ........................ | H04B 7/155 370/315 |
| 2011/0103310 A1* | 5/2011 | Stojanovski | ............ | H04L 12/66 370/328 |
| 2014/0071969 A1* | 3/2014 | Roeland | ................ | H04W 76/11 370/338 |
| 2016/0156404 A1* | 6/2016 | Wolfner | ................ | H04W 76/14 370/315 |

OTHER PUBLICATIONS

3GPP 3rd Generation Partnership Project; Technical Specification Group Services and System Aspects; Study on Architecture Enhancements to Support Proximity-based Services (ProSe) (Release 12), 3GPP TR 23.703, V12.0.0 (Feb. 2014), pp. 1-324.
International Search Report corresponding to PCT/JP2015/003574; 1 page; dated Sep. 29, 2015.
3GPP TS 22.278 V12.4.0 (Sep. 2013); 3rd Generation Partnership Project; Technical Specification Group Services and System Aspects; Service Requirements for the Evolved Packet System (EPS); (Release 12); 45 pages.
3GPP TS 23.303 V12.1.0 (Jun. 2014); 3rd Generation Partnership Project; Technical Specification Group Services and System Aspects; Proximity-based services (ProSe); Stage 2; (Release 12); 60 pages.
3GPP TSG-RAN WG2 #68bis R2-100082; Jan. 18-22, 2010; Header Compression Considerations for Multi-hop Scenario; Institute for Information Industry (III); Huawei, Texas Instruments, Coiler Corporation; 17 pages.
3GPP TR 33.833 V0.5.0; (Feb. 2014); SG-SA WG3 #74bis S3-140603; 3rd Generation Partnerhship Project; Technical Specification Group Services and System Aspects; Study on Security issues to support Proximity Services (Release 12); 4 pages.
China Notification of First Office Action issued in Chinese Patent Application No. 201580054585.8, dated Jun. 27, 2019, 24 pages.

* cited by examiner

RELAY RADIO TERMINAL, CORE NETWORK APPARATUS, AND METHOD THEREFOR

CROSS-REFERENCE TO RELATED APPLICATIONS

This application is a national stage application of International Application No. PCT/JP2015/003574 entitled "RELAY RADIO TERMINAL, CORE NETWORK APPARATUS, AND METHOD THEREFOR," filed on Jul. 15, 2015, which claims the benefit of the priority of Japanese Patent Application No. 2014-206189 filed on Oct. 7, 2014, the disclosures of each of which are hereby incorporated by reference in their entirety.

TECHNICAL FIELD

The present application relates to Proximity Service (ProSe) communication (i.e., inter-terminal direct communication) performed by radio terminals, and more particularly to a user-plane architecture for inter-terminal direct communication.

BACKGROUND ART

3GPP Release 12 specifies Proximity-based services (ProSe) (see, for example, Non-patent Literature 1 and 2). The ProSe includes ProSe discovery and ProSe direct communication. The ProSe discovery identifies that radio terminals capable of performing ProSe direct communication (i.e., ProSe-enabled UEs) are in proximity of each other. In an example, the ProSe discovery can be performed through a procedure in which a ProSe-enabled UE detects another ProSe-enabled UE by using only capability of a radio communication technology (e.g., Evolved Universal Terrestrial Radio Access (E-UTRA) technology) possessed by these two UEs. In another example, the ProSe discovery can be performed by a radio access network (E-UTRA Network (E-UTRAN)) or a core network (Evolved Packet Core (EPC)).

The ProSe direct communication enables establishment of communication paths between two or more ProSe-enabled UEs that are in direct communication range after the ProSe discovery procedure is performed. In other words, the ProSe direct communication enables a ProSe-enabled UE to communicate with another ProSe-enabled UE directly without communicating through a base station (eNodeB). The ProSe direct communication may be performed by using a radio communication technology that is also used to access a base station (eNodeB) (i.e., E-UTRA technology) or by using a wireless local area network (WLAN) radio technology (i.e., IEEE 802.11 radio technology).

In 3GPP Release 12, a ProSe function in a core network (EPC) assists the ProSe discovery and the ProSe direct communication. The ProSe function is a logical function that is used for network-related operations required for the ProSe. The ProSe function provides functionality including, for example, (a) communication with third-party applications (ProSe Application Server), (b) authentication of UEs for ProSe discovery and ProSe direct communication, (c) transmission of configuration information (e.g., designation of radio resources and transmission power) for ProSe discovery and ProSe direct communication to UEs, and (d) provision of EPC-level ProSe discovery. The ProSe function may be implemented in one or more network nodes or entities. In this specification, one or more network nodes or entities that implement the ProSe function are referred to as a "ProSe function entity" or a "ProSe function server".

3GPP Release 12 also defines ProSe UE-to-Network Relaying (see, for example, Sections 4.4.3, 4.5.4, and 5.4.4 of Non-patent Literature 2). The ProSe UE-to-Network Relay relays unicast traffic (downlink and uplink) between a remote UE and a network (E-UTRAN and EPC). More specifically, the ProSe UE-to-Network Relay attaches to a network as a UE, establishes a PDN connection for communication with a ProSe function entity or another Packet Data Network (PDN), and communicates with the ProSe function entity to start ProSe direct communication. Further, the ProSe UE-to-Network Relay executes a discovery procedure with a remote UE, communicates with the remote UE through the inter-terminal direct communication path, and relays unicast traffic (downlink and uplink) between the remote UE and the network. When Internet Protocol version 4 (IPv4) is used, the ProSe UE-to-Network Relay operates as a Dynamic Host Configuration Protocol Version 4 (DHCPv4) Server and Network Address Translation (NAT). When IPv6 is used, the ProSe UE-to-Network Relay operates as a stateless DHCPv6 Relay Agent. In this specification, a UE having the ProSe function and the relay function, like the ProSe UE-to-Network Relay, is referred to herein as a "relay UE", and a UE to which the relay UE provides a relay service is referred to herein as a "remote UE".

The ProSe direct communication in 3GPP Release 12 is one example of the inter-terminal direct communication. Similarly to the ProSe in 3GPP Release 12, inter-terminal direct communication in a mobile communication network includes the discovery phase and direct communication phase that are assisted by a function or a node (e.g., ProSe function) in the network. The inter-terminal direct communication is performed between two or more radio terminals in proximity of each other without communicating through any network node (e.g., a base station). The inter-terminal direct communication is also referred to as "device-to-device (D2D) communication" or "peer-to-peer communication". The ProSe direct communication is an example of the inter-terminal direct communication and is also referred to as "ProSe communication".

CITATION LIST

Non-Patent Literature

Non-patent Literature 1: 3GPP TS 22.278 V 12.4.0 (2013-09), "3rd Generation Partnership Project; Technical Specification Group Services and System Aspects; Service requirements for the Evolved Packet System (EPS) (Release 12)", September, 2013

Non-patent Literature 2: 3GPP TS 23.303 V12.1.0 (2014-06), "3rd Generation Partnership Project; Technical Specification Group Services and System Aspects; Proximity-based services (ProSe); Stage 2 (Release 12)", June, 2014

SUMMARY OF INVENTION

Technical Problem

In the ProSe UE-to-Network Relaying, user IP packets originating from, or destined for, the Remote UE are transferred between the Relay UE and the PDN through an Evolved Packet System (EPS) bearer established between the Relay UE and the core network (EPC). In other words, user IP packets for the Remote UE are treated substantially as user IP packets for the Relay UE in the network (E-UTRAN and EPC) and, accordingly, are not distinguished from user IP packets for the Remote UE in the network (E-UTRAN and EPC).

In this case, the user IP packets for the Remote UE include, for example, packets for ProSe control signaling between the Remote UE and the ProSe function entity. This is because a PC3 reference point between the Remote UE and the ProSe function depends on the user plane of the E-UTRAN and the EPC, and accordingly the ProSe control signaling is transferred on this user plane. The ProSe function entity communicates with the EPC (i.e., P-GW) via an SGi reference point, which is a reference point between a PDN Gateway (P-GW) and a PDN. The user IP packets for the Remote UE may include user IP packets transmitted from the Remote UE to another PDN (e.g., the Internet) and packets received from another PDN.

That is, in the ProSe UE-to-Network Relaying, while both a PDN connection and an EPS bearer associated with the Relay UE are established in the core network (EPC), a PDN connection or a bearer explicitly associated with the Remote UE is not established in the core network (EPC). This user-plane architecture (bearer structure) might be inappropriate in terms of the continuity of services for the Remote UE. For example, when the Remote UE switches from the communication via the ProSe communication path with the Relay UE to the communication provided by the E-UTRAN, it is necessary for the Remote UE to establish a new PDN connection and a new EPS bearer, and it is also necessary to allocate a new IP address to the Remote UE. Accordingly, it may be difficult for the Remote UE to maintain the continuity of services used through the communication via the ProSe communication path, after the communication is switched to the communication provided by the E-UTRAN.

Therefore, one of the objects to be attained by embodiments disclosed herein is to provide an apparatus, a method, and a program which contribute to achievement of a user-plane architecture (bearer structure) suitable for a scenario in which a remote radio terminal communicates with an external network through an inter-terminal direct communication path with a relay radio terminal, like the ProSe UE-to-Network Relaying in 3GPP Release 12.

Solution to Problem

In a first aspect, a method performed by a relay radio terminal includes: (a) establishing a first bearer containing a data radio bearer between the relay radio terminal and a base station and also containing a first General Packet Radio System Tunnelling Protocol (GTP) tunnel between the base station and a core network; (b) establishing a second General Packet Radio System Tunnelling Protocol (GTP) tunnel passing through the first bearer; (c) receiving or transmitting a second user packet destined for, or originating from, a remote radio terminal in the second GTP tunnel passing through the first bearer; and (d) transmitting or receiving the second user packet to or from the remote radio terminal via Proximity Service (ProSe) communication.

In a second aspect, a method performed by a first transfer node located in a core network includes: (a) establishing a first bearer between the first transfer node and a relay radio terminal, the first bearer containing a first General Packet Radio System Tunnelling Protocol (GTP) tunnel; and (b) transmitting or receiving a first user packet to or from the relay radio terminal through the first bearer, the first user packet containing a payload storing a GTP Protocol Data Unit (GTP PDU) that encapsulates a second user packet with a GTP header of a second GTP tunnel. In this aspect, the second user packet is destined for, or originates from, a remote radio terminal and is transferred between the remote radio terminal and the relay radio terminal via Proximity Service (ProSe) communication. The second GTP tunnel passes through the first bearer and is established between the relay radio terminal and the first transfer node, or between the relay radio terminal and a second transfer node that is different from the first transfer node.

In a third aspect, a relay radio terminal includes a memory and a processor coupled to the memory. The processor is adapted to: (a) establish a first bearer containing a data radio bearer between the relay radio terminal and a base station and also containing a first General Packet Radio System Tunnelling Protocol (GTP) tunnel between the base station and a core network; (b) establish a second General Packet Radio System Tunnelling Protocol (GTP) tunnel passing through the first bearer; (c) receive or transmit a second user packet destined for, or originating from, a remote radio terminal in the second GTP tunnel passing through the first bearer; and (d) transmit or receive the second user packet to or from the remote radio terminal via Proximity Service (ProSe) communication.

In a fourth aspect, an apparatus located in a core network includes a memory and a processor coupled to the memory. The processor is adapted to: (a) establish a first bearer between the apparatus and a relay radio terminal, the first bearer containing a first General Packet Radio System Tunnelling Protocol (GTP) tunnel; and (b) transmit or receive a first user packet to or from the relay radio terminal through the first bearer, the first user packet containing a payload storing a GTP Protocol Data Unit (GTP PDU) that encapsulates a second user packet with a GTP header of a second GTP tunnel. In this aspect, the second user packet is destined for, or originates from, a remote radio terminal and is transferred between the remote radio terminal and the relay radio terminal via Proximity Service (ProSe) communication. The second GTP tunnel passes through the first bearer and is established between the relay radio terminal and the apparatus, or between the relay radio terminal and a transfer node that is different from the apparatus.

In a fifth aspect, a program includes instructions (software codes) that, when loaded into a computer, causes the computer to perform the method according to the above-mentioned first or second aspect.

Advantageous Effects of Invention

According to the above-described aspects, it is possible to provide an apparatus, a method, and a program which contribute to achievement of a user-plane architecture (bearer structure) suitable for a scenario in which a remote radio terminal communicates with an external network through an inter-terminal direct communication path with a relay radio terminal.

DESCRIPTION OF EMBODIMENTS

Specific embodiments are described hereinafter in detail with reference to the drawings. The same or corresponding elements are denoted by the same symbols throughout the drawings, and duplicated explanations are omitted as necessary for the sake of clarity.

Embodiments described below are explained using an Evolved Packet System (EPS) as a main target. However, these embodiments are not limited to being applied to the EPS, and may also be applied to other mobile communication networks or systems, such as 3GPP Universal Mobile Telecommunications System (UMTS), 3GPP2 CDMA2000 system (1×RTT, HRPD (High Rate Packet Data)), Global System for Mobile communications (GSM (Registered Trademark))/General packet radio service (GPRS) system, and WiMAX system.

First Embodiment

Figure 1:
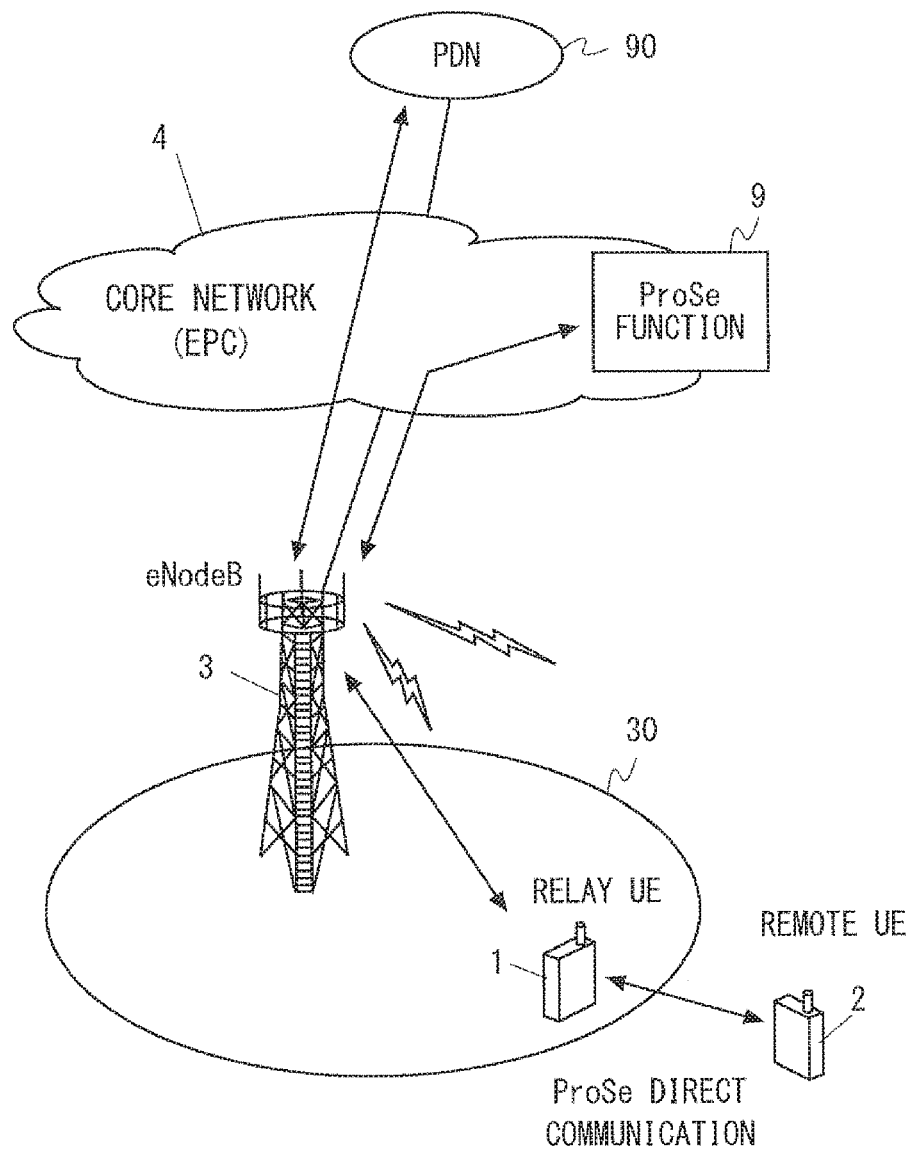
FIG. 1 is a diagram showing a configuration example of radio communication systems according to some embodiments.

FIG. 1 shows a configuration example of a radio communication system according to this embodiment. Both a relay UE 1 and a Remote UE 2 are UEs capable of providing ProSe (i.e., ProSe-enabled UEs), and they perform ProSe direct communication (inter-terminal direct communication) between them. Further, the Relay UE 1 relays unicast traffic (downlink and uplink) between the Remote UE 2 and a network (eNodeB 3 and EPC 4). The Relay UE 1 attaches to the EPC 4, establishes a PDN connection for communicating with a ProSe function entity 9, and communicates with the ProSe function entity 9 to start the ProSe direct communication. The Relay UE 1 may use a ProSe discovery service provided by the ProSe function entity 9. The Relay UE 1 may receive from the ProSe function entity 9 a message indicating permission for the Relay UE 1 to activate ProSe discovery or ProSe direct communication. The Relay UE 1 may receive, from the ProSe function entity 9, configuration information (e.g., designation of radio resources and transmission power) for ProSe discovery or ProSe direct communication. The Relay UE 1 may further establish a PDN connection for communicating with another Packet Data Network (PDN) 90 that is different from the ProSe function entity 9, and may communicate with the PDN 90.

The Remote UE 2 communicates with the ProSe function entity 9 or another PDN 90 through the ProSe direct communication path (inter-terminal direct communication path) with the Relay UE 1. In the example of FIG. 1, the Remote UE 2 is located outside of a coverage area (cell) 30 of the eNodeB 3 (i.e., out of coverage). However, the Remote UE 2 may be located inside of the coverage area 30 (i.e., in coverage) and may select the direct communication with the Relay UE 1, instead of the direct communication with the eNodeB 3, based on certain conditions (e.g., selection by a user).

Figure 2:
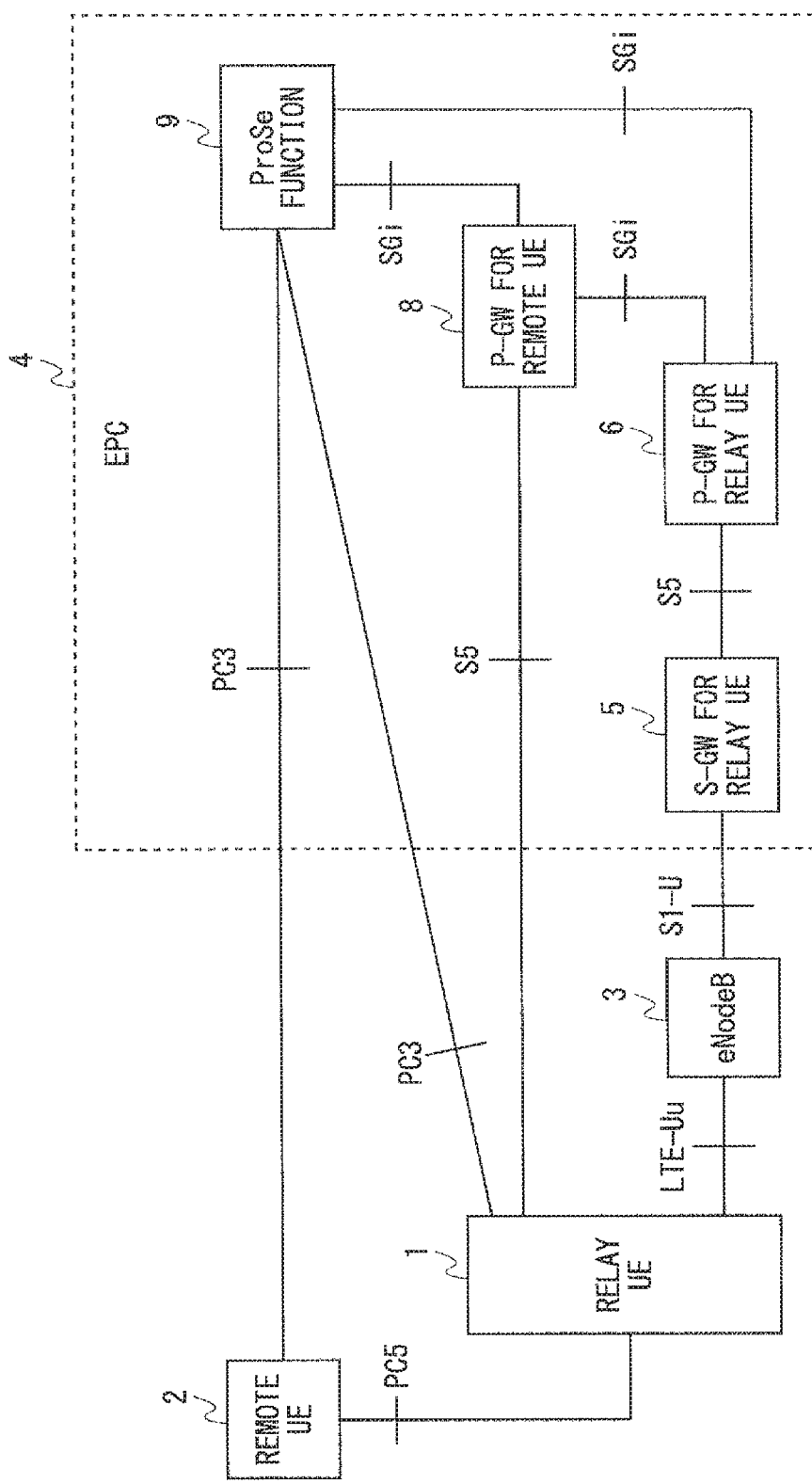
FIG. 2 is a diagram showing reference points in a radio communication system according to a first embodiment.

FIG. 2 shows reference points (PC3 and PC5) regarding ProSe in the radio communication system according to this embodiment, and also shows reference points for the user plane of the EPS that are used for transmitting ProSe control signaling at the PC3 reference point. Each reference point is also called an "interface".

First, reference points used to transfer user IP packets for the Relay UE 1 will be described. User IP packets for the Relay UE 1 include uplink user IP packets originating from the Relay UE 1 and downlink user IP packets destined for the Relay UE 1. For example, user IP packets for the Relay UE 1 carry ProSe control signaling and are transferred between the Relay UE 1 and the ProSe function entity 9. As described above, the PC3 reference point depends on the user plane of the E-UTRAN and the EPC, and accordingly the ProSe control signaling is transferred on this user plane. Although not shown in FIG. 2, the Relay UE 1 may transmit and receive user IP packets to and from another PDN 90, which is different from the ProSe function entity 9.

For example, the Relay UE 1 establishes a PDN connection with a PDN including the ProSe function entity 9 to exchange ProSe control signaling with the ProSe function entity 9 through the PC3 reference point. One or more EPS bearers regarding the PDN connection between the Relay UE1 and the PDN including the ProSe function entity 9 are established between the Relay UE 1 and a P-GW 6 for the Relay UE 1. The P-GW 6 for the Relay UE 1 is associated with the Relay UE 1 and is also associated with the Access Point Name (APN) corresponding to the PDN including the ProSe function entity 9. Each EPS bearer established between the P-GW 6 and the Relay UE 1 consists of: a data radio bearer (DRB) at a Long Term Evolution (LTE)-Uu reference point between the Relay UE 1 and the eNodeB 3; an S1 bearer at an S1-U reference point between the eNodeB 3 and an S-GW 5; and an S5 bearer at an S5 reference point between the S-GW 5 and the P-GW 6.

The Relay UE 1 communicates with the eNodeB 3 in a radio access network (i.e., U-TRAN) through the LTE-Uu reference point. The LTE-Uu reference point is a radio interface and includes signaling radio bearers (SRBs) carrying messages regarding a control connection (i.e., Radio Resource Control (RRC) connection) and data radio bearers (DRBs) carrying downlink and uplink user IP packets.

The eNodeB 3 communicates with the S-GW 5 for the Relay UE 1 via the S1-U reference point. The S1-U reference point uses the GPRS Tunneling Protocol User Plane (GTP-U). The eNodeB 3 establishes one or more S1 bearers (i.e., GTP tunnels) with the S-GW 5 at the S1-U reference point and transfers downlink and uplink user IP packets for the Relay UE1 through these S1-U bearers. The one or more S1-U bearers are mapped to the one or more DRBs, which are established between the Relay UE 1 and the eNodeB 3, on a one-to-one basis.

The S-GW 5 for the Relay UE 1 communicates with the P-GW 6 for the Relay UE 1 through the S5 reference point. The S5 reference point uses the GTP-U to transfer user IP packets and uses the GTP Control Plane version 2 (GTP-Cv2) to perform management of the GTP tunnel, such as establishment and release of the GTP tunnel. The S-GW 5 establishes one or more 55 bearers (i.e., GTP tunnels) with the P-GW 6 at the S5 reference point and transfers downlink and uplink user IP packets for the Relay UE 1 through these S5 bearers. The one or more S5 bearers are mapped to the one or more S1 bearers, which are established between the eNodeB 3 and the S-GW 5, on a one-to-one basis.

The P-GW 6 for the Relay UE 1 communicates with the ProSe function entity 9 through an SGi reference point. Specifically, the P-GW 6 receives uplink user IP packets, which have been transmitted from the Relay UE 1 and are destined for the ProSe function entity 9, through the S5 bearers (GTP tunnel) between the P-GW 6 and the S-GW 5, and transmits them to the ProSe function entity 9 through the SGi reference point. Further, the P-GW 6 receives downlink user IP packets, which have been transmitted from the ProSe function entity 9 and are destined for the Relay UE 1, through the SGi reference point, and transmits them in the S5 bearer (i.e., GTP tunnel) for the Relay UE 1 between the P-GW 6 and the S-GW 5. Note that the P-GW 6 may communicate not only with the ProSe function entity 9, but also with another PDN 90, which is not shown in FIG. 2, through the SGi reference point.

Next, reference points for transferring user IP packets for the Remote UE 2 will be described. User IP packets for the Remote UE 2 include uplink user IP packets originating from the Remote UE 2 and downlink user IP packets destined for the Remote UE 2. For example, user IP packets for the Remote UE 2 carry ProSe control signaling and are transferred between the Remote UE 2 and the ProSe function entity 9 (i.e., transferred at the PC3 reference point). Although not shown in FIG. 2, the Remote UE 2 may transmit and receive user IP packets to and from another PDN 90, which is different from the ProSe function entity 9.

The Remote UE 2 establishes a ProSe direct communication path with the Relay UE 1 to transmit and receive user IP packets (e.g., user IP packets containing ProSe control signaling between the ProSe function entity 9 and the Remote UE 2 on the PC3 reference point). The Remote UE 2 may request the Relay UE 1 to provide communication with the ProSe function entity 9.

The Relay UE 1 has a function of terminating a GTP tunnel to transfer user IP packets for the Remote UE 2. Specifically, the Relay UE 1 according to this embodiment has the S5 reference point with a P-GW 8 for the Remote UE 2, exchanges GTP-Cv2 signaling with the P-GW 8, establishes a GTP tunnel (S5 bearer) to the P-GW 8, and transfers user IP packets for the Remote UE 2 through this GTP tunnel (S5 bearer). It should be noted herein that this GTP tunnel (S5 bearer) between the P-GW 8 for the Remote UE 2 and the Relay UE 1 is established so as to pass through the EPS bearer between the P-GW 6 for the Relay UE 1 and the Relay UE 1 (i.e., the DRB between the Relay UE 1 and the eNodeB 3, the S1 bearer (GTP tunnel) between the eNodeB 3 and the S-GW 5, and the S5 bearer (GTP tunnel) between the S-GW 5 and the P-GW 6). In other words, GTP tunnel packets regarding the GTP tunnel (S5 bearer) between the P-GW 8 for the Remote UE 2 and the Relay UE 1 are transferred through the EPS bearer between the P-GW 6 for the Relay UE 1 and the Relay UE 1. That is, GTP tunnel packets regarding the GTP tunnel between the P-GW 8 and the Relay UE 1 are treated in the same manner as user IP packets for the Relay UE 1 are treated. Note that, each GTP tunnel packet regarding the GTP tunnel between the P-GW 8 and the Relay UE 1 is an IP packet containing a payload storing a GTP Protocol Data Unit (GTP PDU) that encapsulates a user IP packet for the Remote UE 2 with a GTP header of this GTP tunnel. The GTP PDU carrying a user IP packet is also referred to as a "GTP-U message" or a "G-PDU".

The P-GW 8 for the Remote UE 2 communicates with the Relay UE 1 via the S5 reference point, and communicates with the ProSe function entity 9 via the SGi reference point. Specifically, the P-GW 8 receives uplink user IP packets, which have been transmitted from the Remote UE 2 and is destined for the ProSe function entity 9, through the S5 bearer (i.e., GTP tunnel) for the Remote UE 2 between the P-GW 8 and the Relay UE 1, and transmits them to the ProSe function entity 9 through the SGi reference point. Further, the P-GW 8 receives downlink user IP packets, which have been transmitted from the ProSe function entity 9 and is destined for the Remote UE2, through the SGi reference point, and transmits them in the S5 bearer (GTP tunnel) for the Remote UE 2 between the P-GW 8 and the Relay UE 1. Note that the P-GW 8 may communicate not only with the ProSe function entity 9, but also with another PDN 90, which is not shown in FIG. 2, through the SGi reference point. In FIG. 2, the P-GW 8 for the Remote UE 2 may be the same P-GW as the P-GW 6 for the Relay UE 1. In other words, the APN for the Remote UE 2 to communicate with the ProSe function entity 9 or with another PDN 90 may be associated with the P-GW 6 with which the APN for the Relay UE 1 to communicate with the ProSe function entity 9 or another PDN 90 is associated.

Figure 3:
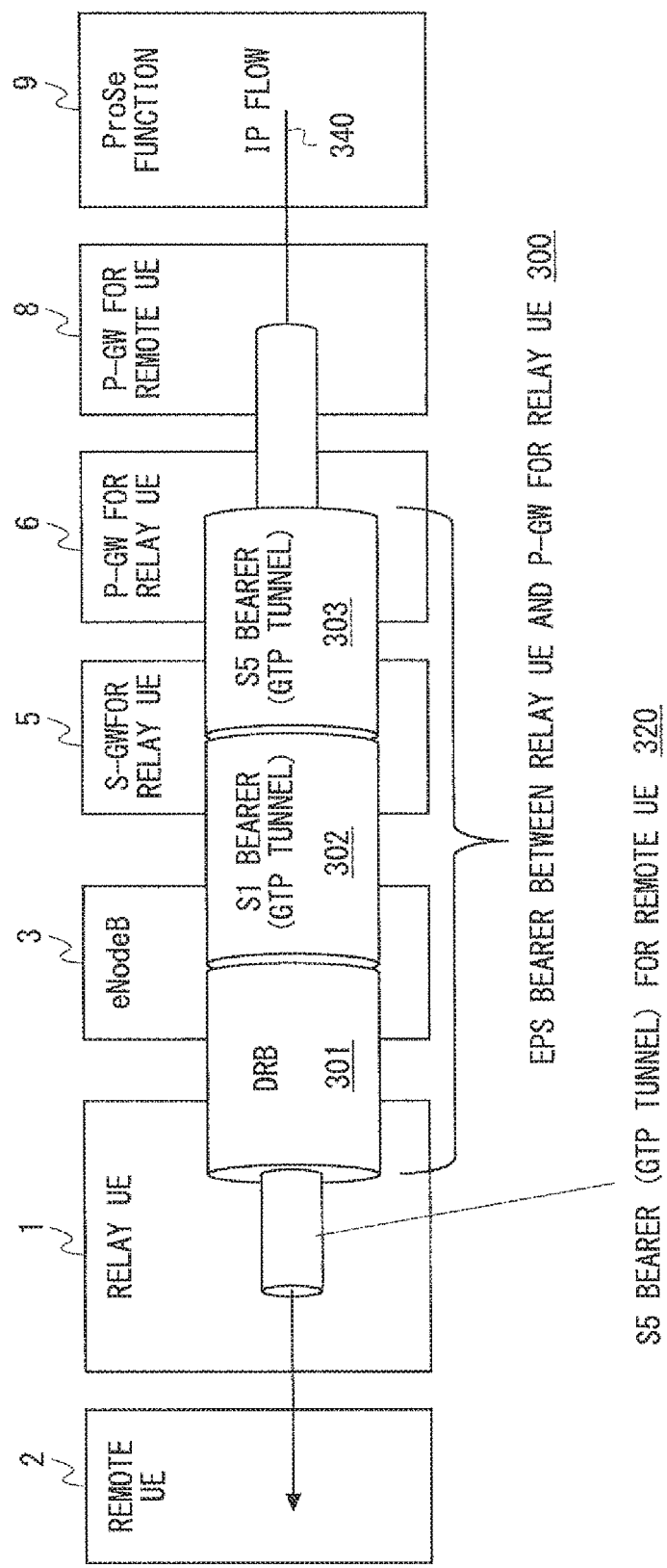
FIG. 3 is a diagram showing an example of a user-plane architecture (bearer structure) according to the first embodiment.

FIG. 3 is a diagram showing an example of a user-plane architecture (bearer structure) according to this embodiment. As described above with reference to FIG. 2, in this embodiment, the Relay UE 1 terminates an S5 bearer (GTP tunnel) 320 for the Remote UE 2. The S5 bearer (GTP tunnel) 320 for the Remote UE 2 transfers user IP packets for the Remote UE 2 (i.e., IP flow 340). The S5 bearer (GTP tunnel) 320 is established so as to pass through an EPS bearer 300 between the P-GW 6 for the Relay UE 1 and the Relay UE 1. In other words, GTP tunnel packets of the S5 bearer 320 carrying user IP packets for the Remote UE 2 are transferred through the EPS bearer 300. The EPS bearer 300 consists of a DRB 301 between the Relay UE 1 and the eNodeB 3, an S1 bearer 302 between the eNodeB 3 and the S-GW 5, and an S5 bearer 303 between the S-GW 5 and the P-GW 6. While FIG. 3 shows a transfer of the downlink IP flow 340 from the ProSe function entity 9 to the Remote UE 2, an uplink IP flow is also transferred through the S5 bearer (GTP tunnel) between the P-GW 8 for the Remote UE 2 and the Relay UE 1. Uplink and downlink IP flows between another PDN 90 and the Remote UE 2 may also be transferred through an S5 bearer (GTP tunnel) between the P-GW 8 for the Remote UE 2 and the Relay UE 1, like in FIG. 3.

Figure 4:
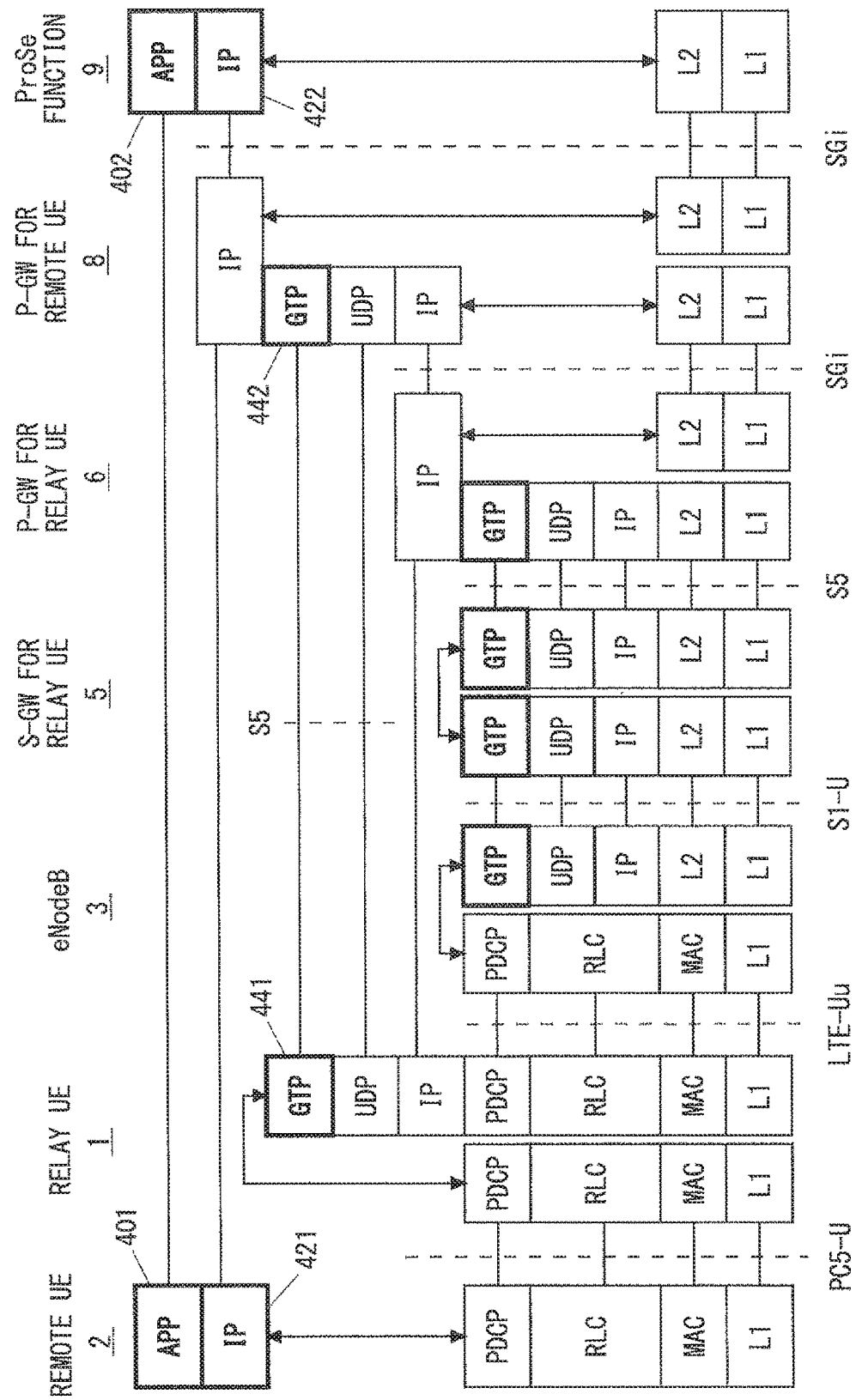
FIG. 4 is a diagram showing a user-plane protocol stack according to the first embodiment.

FIG. 4 shows a protocol stack regarding the PC3 reference point for the Remote UE 2 to communicate with the ProSe function entity 9. As described a few times above, ProSe control signaling on the PC3 reference point is transferred on the user plane. In other words, an application layer 401 of the Remote UE 2 communicates with an application layer 402 of the ProSe function entity 9 to exchange ProSe control signaling on the PC3 reference point. The application layer 401 of the Remote UE 2 may communicate with an application layer of a node in another PDN 90. An IP layer 421 of the Remote UE 2 transmits or receives user IP packets originating from, or destined for, the Remote UE 2 to or from an IP layer 422 of the ProSe function entity 9. These user IP packets originating from, or destined for, the Remote UE 2 are transferred through a GTP tunnel (S5 bearer) established between a GTP layer 441 of the Relay UE 1 and a GTP layer 442 of the P-GW 8 for the Remote UE 2. Note that, each IP packet (GTP tunnel packet) encapsulating a user IP packet for the Remote UE 2 is further encapsulated in GTP layers of the eNodeB 3, the S-GW 5, and the P-GW 6 so as to be transferred through the EPS bearer between the Relay UE 1 and the P-GW 6 for the Relay UE 1.

Figure 5:
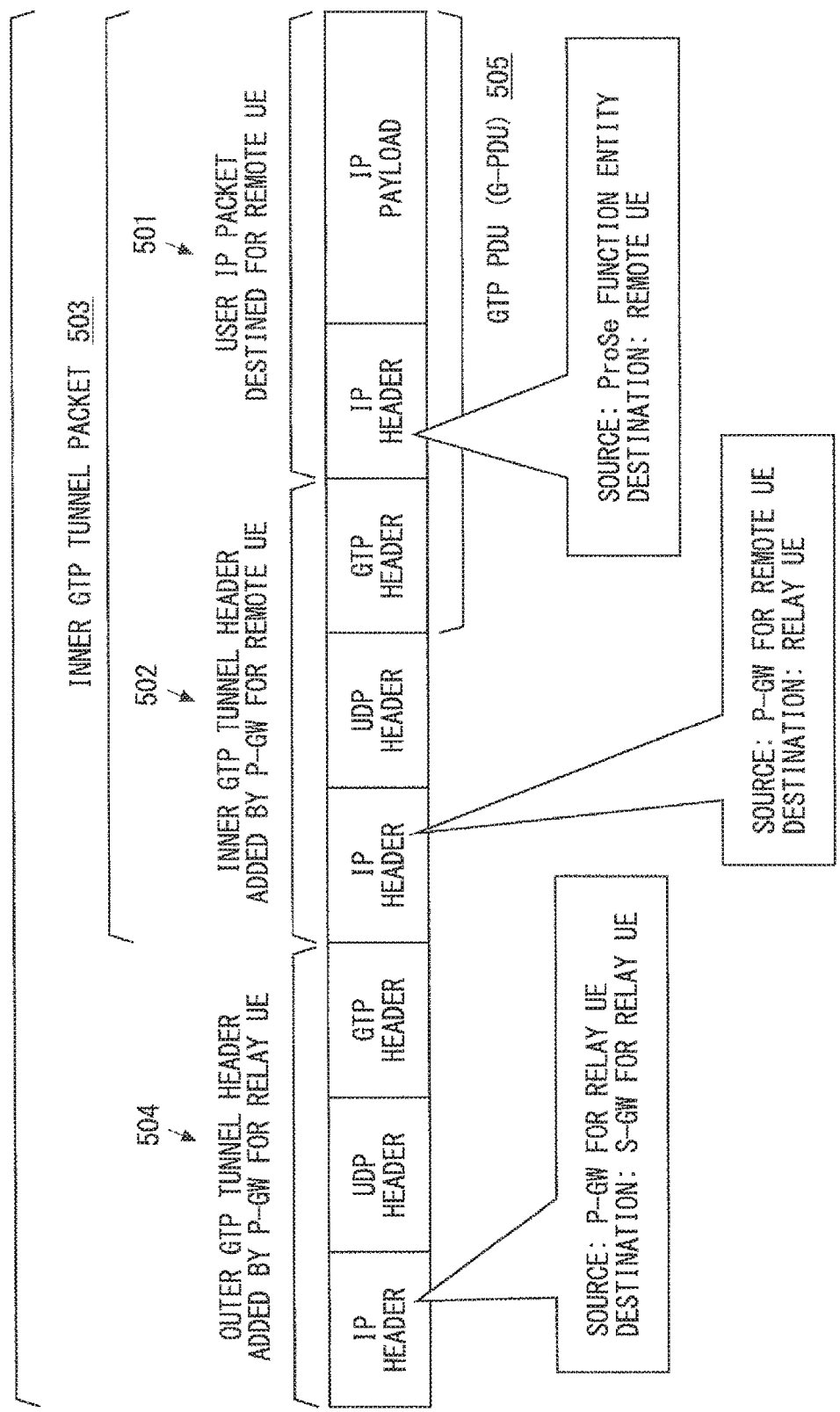
FIG. 5 is a diagram showing a configuration example of a downlink IP packet transmitted at an S5 reference point to an S-GW for a Relay UE from a P-GW for the Relay UE according to the first embodiment.

FIG. 5 shows a configuration example of a downlink IP packet 500 sent from the P-GW 6 for the Relay UE 1 to the S-GW 5 for the Relay UE 1 at the S5 reference point. The P-GW 6 for the Relay UE 1 receives a GTP tunnel packet 503 from the P-GW 8 for the Remote UE 2 at the SGi reference point. The GTP tunnel packet 503 is an IP packet to be transmitted to the Relay UE 1 from the P-GW 8, and encapsulates a downlink user IP packet 501 destined for the Remote UE 2 with a GTP tunnel header 502. The downlink user IP packet 501 is transmitted to the Remote UE 2 by the ProSe function entity 9 or a node in another PDN 90. The GTP tunnel header 502 includes a GTP header, a User Datagram Protocol (UDP) header, and an IP header, and is added to the user IP packet 501 by the P-GW 8 for the Remote UE 2. A GTP PDU (G-PDU) 505 consists of the GTP header and the user IP packet 501. The IP header contained in the GTP tunnel header 502 designates the P-GW 8 for the Remote UE 2 as the source, and designates the Relay UE 1 as the destination.

The P-GW 6 for the Relay UE 1 generates the downlink IP packet 500 containing the GTP tunnel packet 503 in the payload thereof. The P-GW 6 adds, to the GTP tunnel packet 503 (inner GTP tunnel packet), an outer GTP tunnel header 504 including a GTP header, a User Datagram Protocol (UDP) header, and an IP header. The IP header in the outer GTP tunnel header 504 designates the P-GW 6 for the Relay UE 1 as the source, and designates the S-GW 5 for the Relay UE 1 as the destination.

As described above, the Relay UE 1 according to this embodiment transmits and receives user IP packets for the Remote UE 2 destined for, or originating from, the Remote UE 2 via the ProSe direct communication (inter-terminal direct communication). Further, the Relay UE 1 has a capability of terminating a GTP tunnel. The Relay UE 1 is configured to establish a GTP tunnel between the Relay UE 1 and the P-GW 8 for the Remote UE 2 so as to pass through its own EPS bearer (i.e., the EPS bearer between the Relay UE 1 and the P-GW 6 for the Relay UE 1), and transfer user IP packets (e.g., user IP packets carrying ProSe control signaling) for the Remote UE 2 through this GTP tunnel. GTP tunnel packets encapsulating user IP packets for the Remote UE 2 are transferred through the EPS bearer of the Relay UE 1 as described above with reference to FIGS. 2 to 4.

Owing to such a user-plane architecture (bearer structure), even when the Remote UE 2 uses the relay service provided by the Relay UE 1 via ProSe direct communication, the P-GW 8 for the Remote UE 2 can manage the user-plane IP address of the Remote UE2 and contexts regarding the EPS bearer of the Remote UE 2 (e.g., Tunnel Endpoint ID (TEID) of the S5 bearer, APN, EPS bearer ID, and bearer QoS). This contributes to, for example, the continuity of services for the Remote UE 2. This is because, when the Remote UE 2 switches from the communication with the Relay UE 1 via the ProSe communication path to the communication provided by the E-UTRAN (eNodeB 3), the P-GW 8 for the Remote UE 2 can modify and reuse the GTP tunnel (e.g., the S5 bearer (GTP tunnel) 320 shown in FIG. 3) which has already been established for the Remote UE 2. The P-GW 8 for the UE 2 can continue to use, for example, the user-plane IP address of the Remote UE 2, the TEID of the P-GW 8 regarding the S5 bearer, and the APN.

Figure 6:
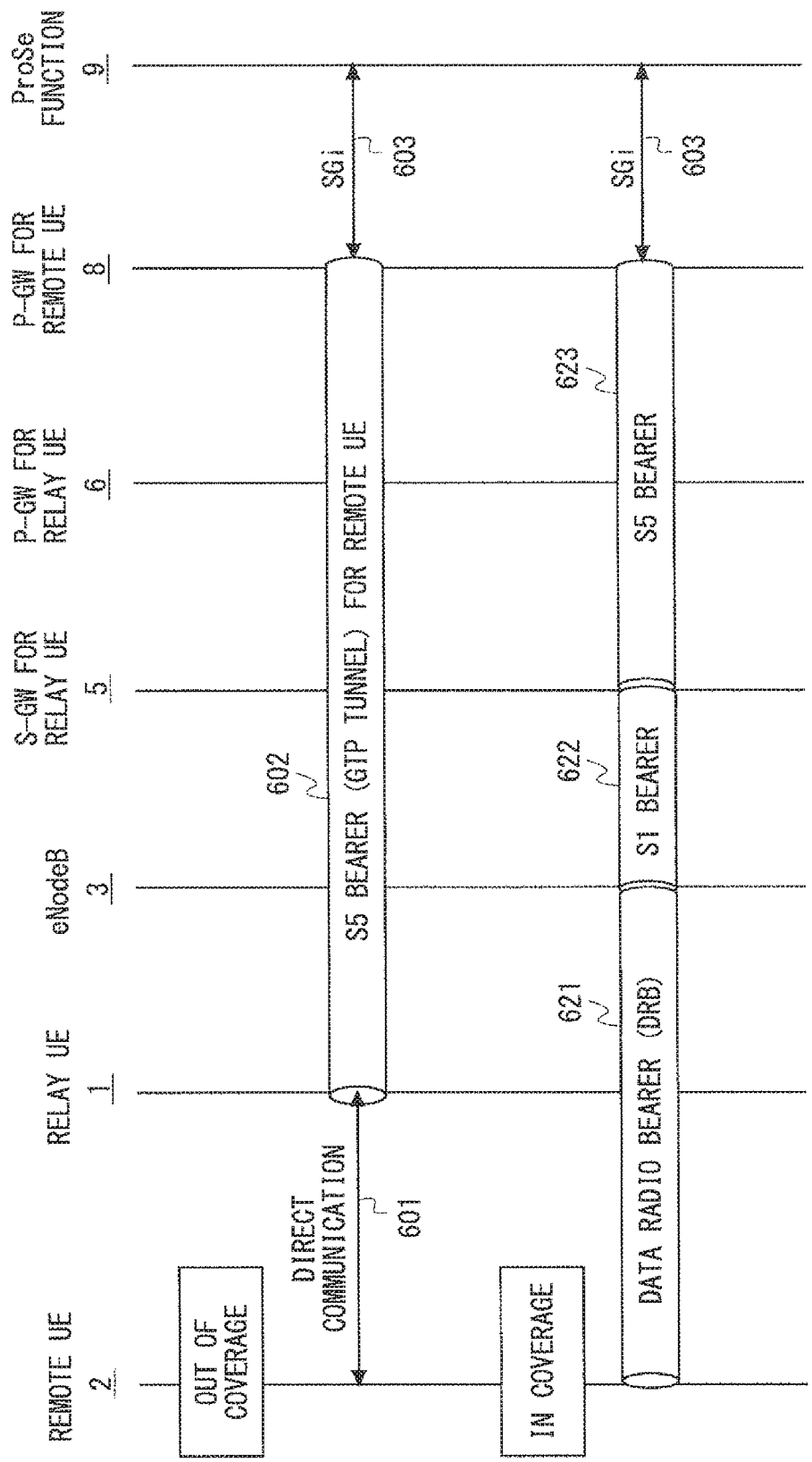
FIG. 6 is a diagram showing a bearer structure when a Remote UE is out of coverage and a bearer structure when the Remote UE is in coverage.

FIG. 6 is a diagram showing an example of a bearer structure when the Remote UE 2 is out of coverage (i.e., when the Remote UE 2 uses ProSe direct communication with the Relay UE 1) and an example of a bearer structure when the Remote UE 2 is in coverage (i.e., when the Remote UE 2 uses communication with the E-UTRAN (eNodeB 3)). When the Remote UE 2 is out of coverage, user IP packets for the Remote UE 2 are transferred through a ProSe direct communication path 601, an S5 bearer (GTP tunnel) 602 between the Relay UE 1 and the P-GW 8 for the Remote UE 2, and an SGi reference point 603 of the P-GW 8. On the other hand, when the Remote UE 2 is in coverage, user IP packets for the Remote UE 2 are transferred through, for example, a DRB 621 between the Remote UE 2 and the eNodeB 3, an S1 bearer (GTP tunnel) 622 between the eNodeB 3 and the S-GW 5 for the Relay UE 1, an S5 bearer (GTP tunnel) 623 between the S-GW 5 for the Relay UE 1 and the P-GW 8 for the Remote UE 2, and the SGi reference point 603 of the P-GW 8. The S1 bearer (GTP tunnel) 622 may be established in another S-GW, instead of the S-GW 5 for the Relay UE 1. It should be noted, as shown in FIG. 6, that the P-GW 8 for the Remote UE 2 terminates the S5 bearer (602 and 623) for the Remote UE 2 when the Remote UE 2 is in coverage, as well as when the Remote UE 2 is out of coverage. The P-GW 8 for the Remote UE 2 modifies the S5 bearer 602 when the Remote UE 2 is out of coverage, so that the P-GW 8 can obtain the S5 bearer 623 when the Remote UE 2 is in coverage.

Second Embodiment

The first embodiment provides an example in which the Relay UE 1 terminates an S5 bearer. On the other hand, this embodiment provides an example in which the Relay UE 1 terminates an S1 bearer. A configuration example of a radio communication system according to this embodiment is similar to that shown in FIG. 1 described above in the first embodiment.

Figure 7:
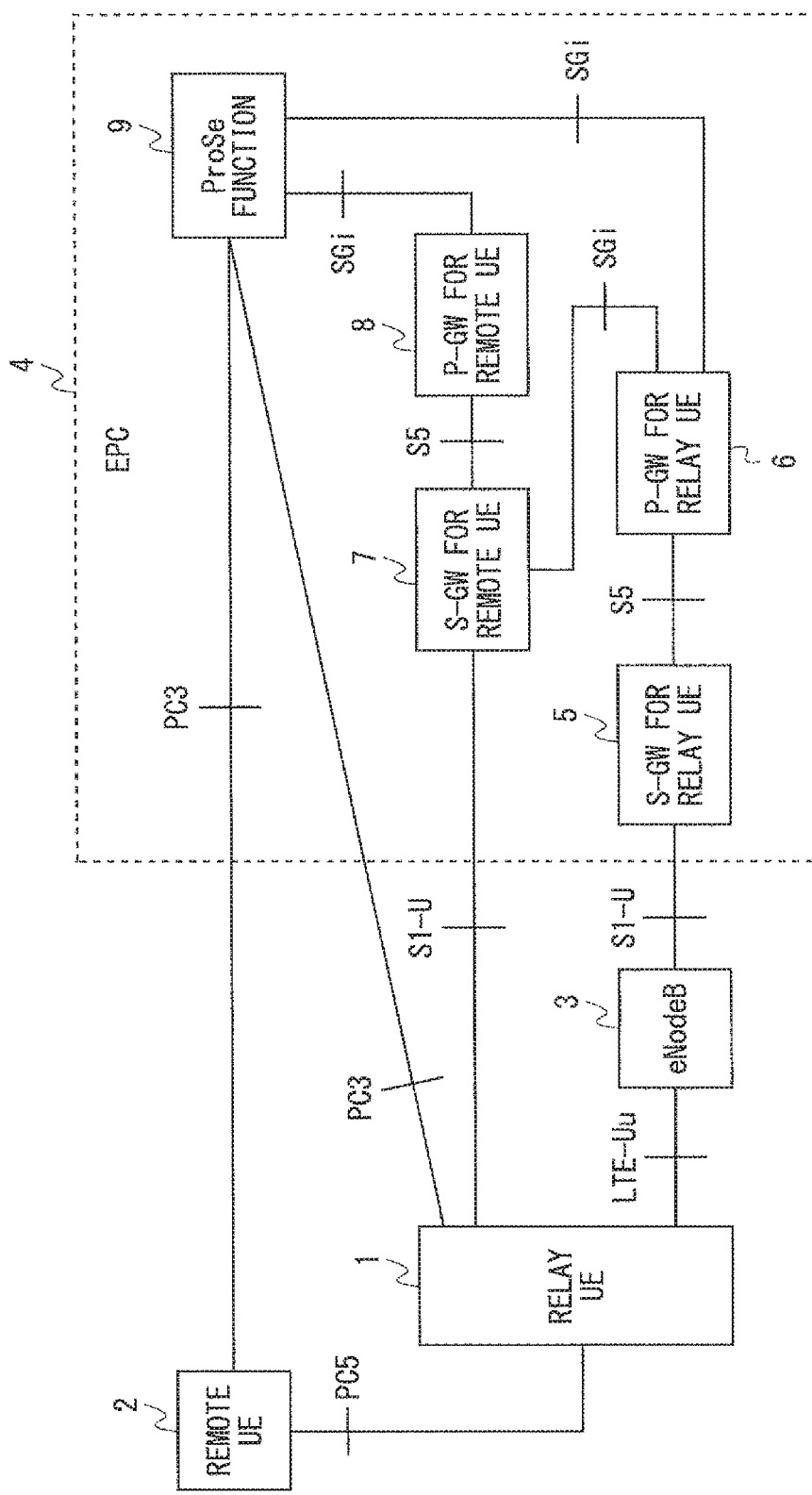
FIG. 7 is a diagram showing reference points in a radio communication system according to a second embodiment.

FIG. 7 shows reference points (PC3 and PC5) regarding ProSe in the radio communication system according to this embodiment, and also shows reference points of for the user plane of the EPS that are used for transmitting ProSe control signaling at the PC3 reference point. FIG. 7 differs from FIG. 2 described above in that the Relay UE 1 has an S1-U reference point with an S-GW 7 for the Remote UE 2 and the P-GW 8 for the Remote UE 2 has an SGi reference point with the S-GW7 for the Remote UE 2. For example, the Relay UE 1 exchanges S1-AP signaling with an Mobility Management Entity (MME) (not shown), establishes a GTP tunnel (S1 bearer) with the S-GW 7 for the Remote UE 2, and transfers user IP packets for the Remote UE 2 through this GTP tunnel (S1 bearer). In FIG. 7, the P-GW 8 for the Remote UE 2 may be the same P-GW as the P-GW 6 for the Relay UE 1. The S-GW 7 for the Remote UE 2 may be the same P-GW as the S-GW 5 for the Relay UE 1.

Figure 8:
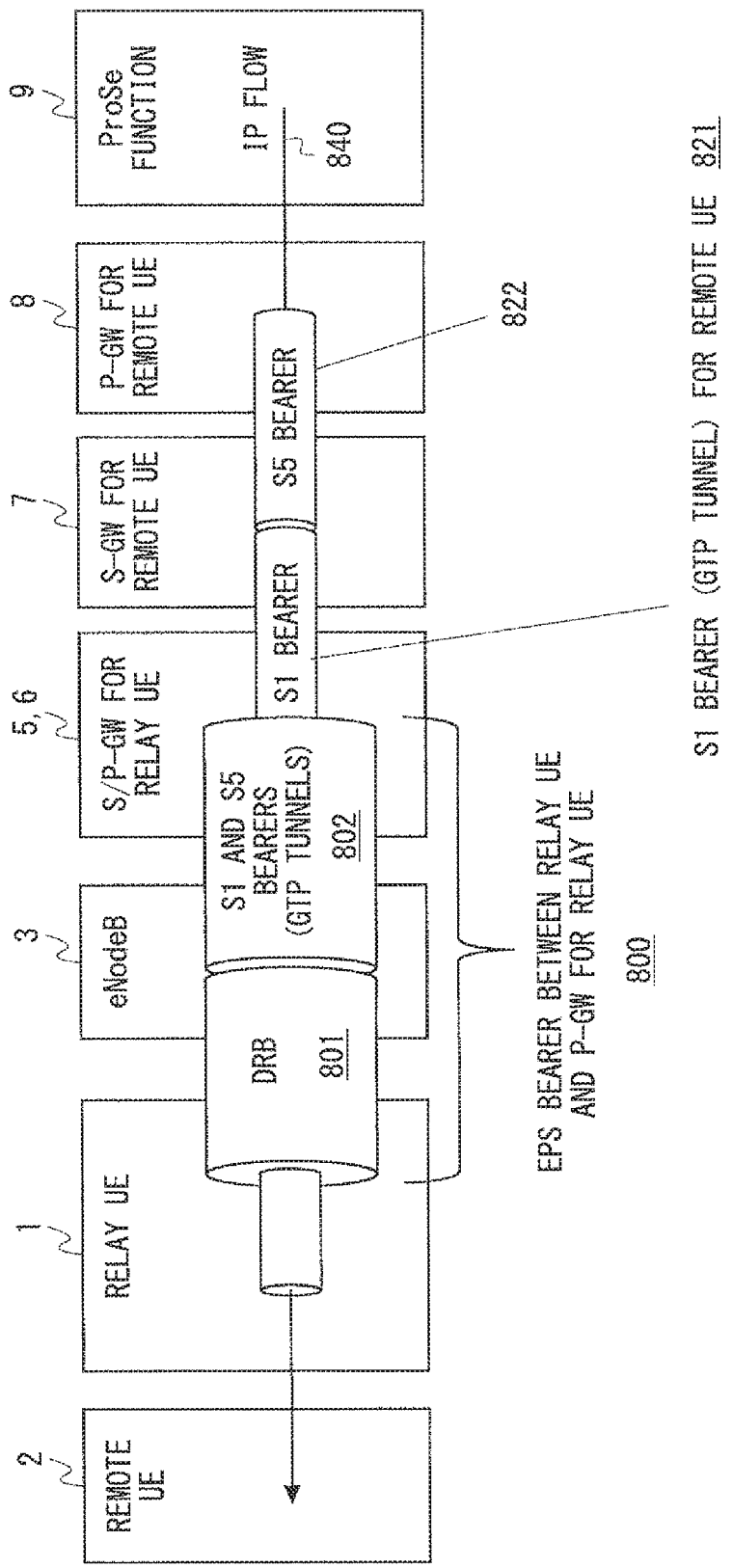
FIG. 8 is a diagram showing an example of a user-plane architecture (bearer structure) according to the second embodiment.

FIG. 8 is a diagram showing an example of a user-plane architecture (bearer structure) according to this embodiment. As described above with reference to FIG. 7, in this embodiment, the Relay UE 1 terminates an S1 bearer (GTP tunnel) 821 for the Remote UE 2. The S1 bearer (GTP tunnel) 821 for the Remote UE 2 is connected to an S5 bearer 822 in the S-GW 7 to transfer user IP packets for the Remote UE 2 (i.e., IP flow 840). The S1 bearer (GTP tunnel) 820 is established so as to pass through an EPS bearer 800 between the Relay UE 1 and the P-GW 6 for the Relay UE 1. In other words, GTP tunnel packets of the S1 bearer 820 carrying user IP packets for the Remote UE 2 are transferred through the EPS bearer 800. The EPS bearer 800 consists of a DRB 801 between the Relay UE 1 and the eNodeB 3, an S1 bearer between the eNodeB 3 and the S-GW 5, and a S5 bearer (802) between the S-GW 5 and the P-GW 6. While FIG. 8 shows a transfer of the downlink IP flow 840 from the ProSe function entity 9 to the Remote UE 2, an uplink IP flow is also transferred through the S1 bearer (GTP tunnel) between the S-GW 7 for the Remote UE 2 and the Relay UE 1. Uplink and downlink IP flows between the Remote UE 2 and another PDN 90 may also be transferred through an S5 bearer (GTP tunnel) between the S-GW 7 for the Remote UE 2 and the Relay UE 1, like in FIG. 8.

Figure 9:
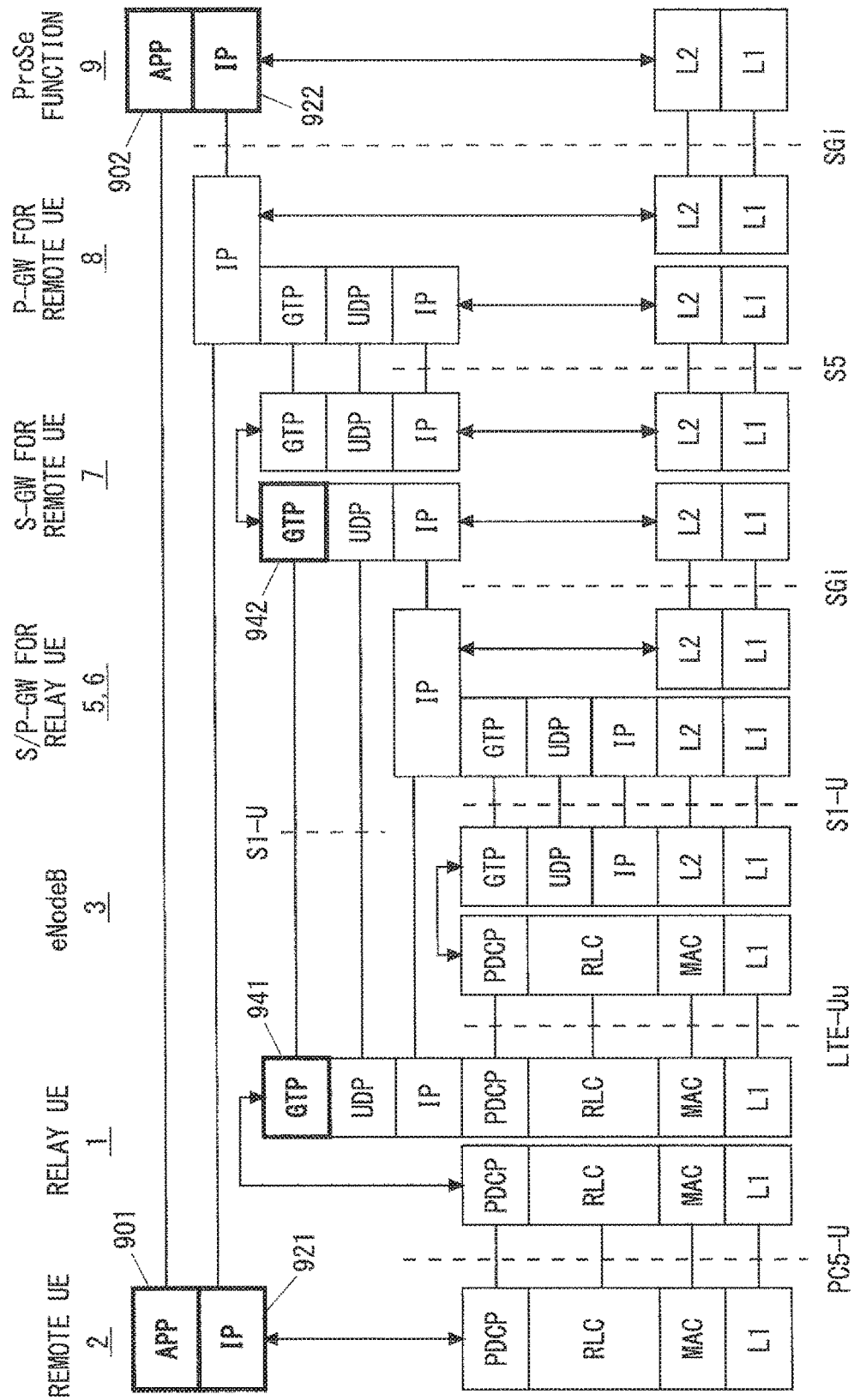
FIG. 9 is a diagram showing a user-plane protocol stack according to the second embodiment.

FIG. 9 shows a protocol stack regarding the PC3 reference point for the Remote UE 2 to communicate with the ProSe function entity 9. An application layer 901 of the Remote UE 2 communicates with an application layer 902 of the ProSe function entity 9 to exchange ProSe control signaling on the PC3 reference point. The application layer 901 of the Remote UE 2 may communicate with an application layer of a node in another PDN 90. An IP layer 921 of the Remote UE 2 transmits or receives user IP packets originating from, or destined for, the Remote UE 2 to or from an IP layer 922 of the ProSe function entity 9. These user IP packets originating from, or destined for, the Remote UE 2 are transferred through a GTP tunnel (S1 bearer) established between a GTP layer 941 of the Relay UE 1 and a GTP layer 942 of the S-GW 7 for the Remote UE 2. Note that, each IP packet (GTP tunnel packet) encapsulating a user IP packet for the Remote UE 2 is further encapsulated in GTP layers of the eNodeB 3, the S-GW 5, and the P-GW 6 so as to be transferred through the EPS bearer between the Relay UE 1 and the P-GW 6 for the Relay UE 1.

Figure 10:
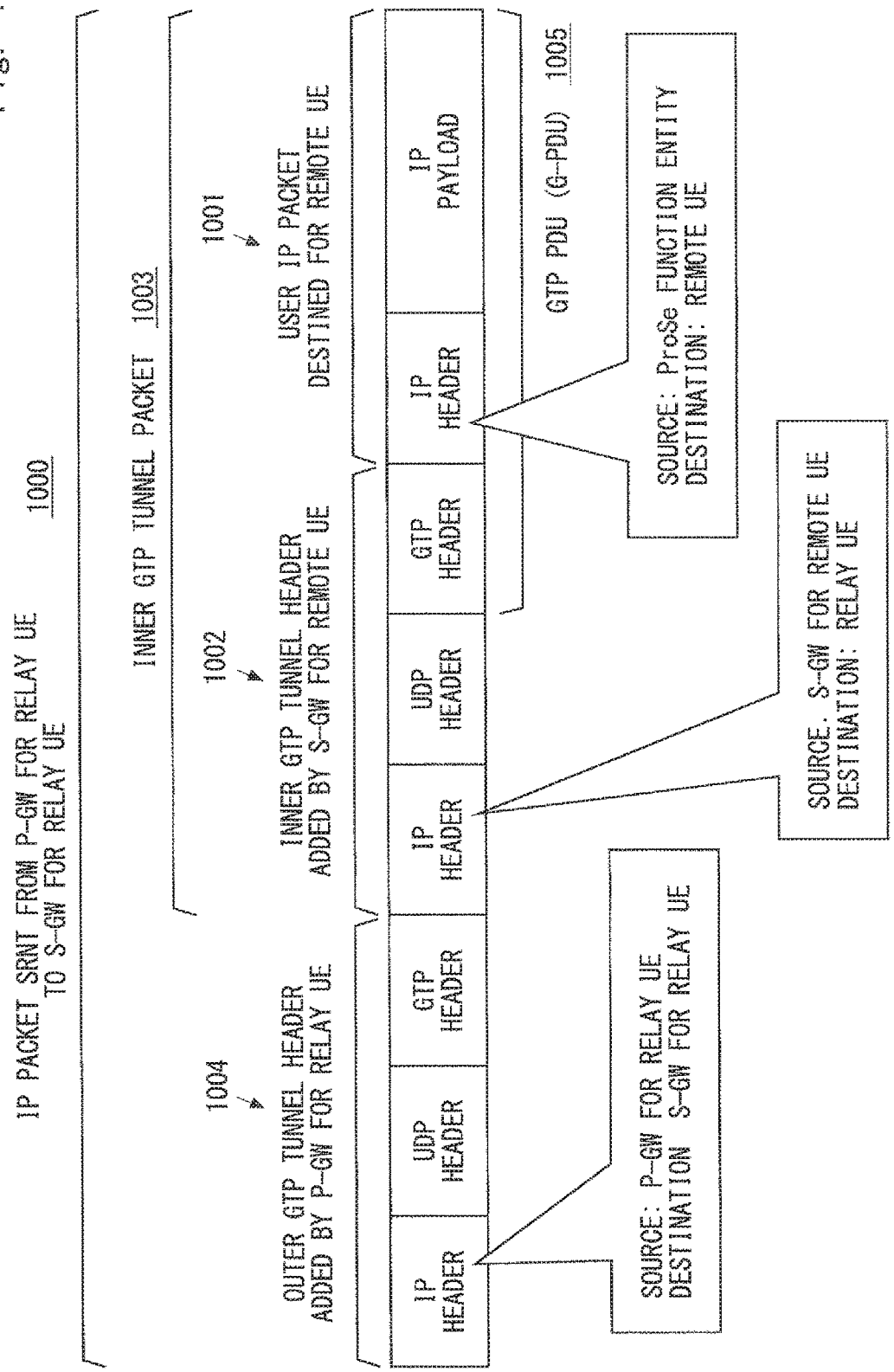
FIG. 10 is a diagram showing a configuration example of a downlink IP packet transmitted at an S1-U reference point to an eNodeB from an S-GW for a Relay UE according to the second embodiment.

FIG. 10 shows a configuration example of a downlink IP packet 1000 sent from the P-GW 6 for the Relay UE 1 to the S-GW 5 at the S5 reference point. The downlink IP packet 1000 includes an outer GTP tunnel header 1004 and an inner GTP tunnel packet 1003. The inner GTP tunnel packet 1003 includes an inner GTP tunnel header 1002 and a downlink user IP packet 1001 for the Remote UE 2. A GTP PDU (G-PDU) 1005 consists of the GTP header and the user IP packet 1001. The configuration of the downlink IP packet 1000 is the same as that of the downlink IP packet 500 shown in FIG. 5, except that the IP header within the inner GTP tunnel header 1002 designates the S-GW 7 for the Remote UE 2 as the source.

As described above, in this embodiment, the Relay UE 1 transfers user IP packets, destined for, or originating from, the Remote UE 2, through the ProSe direct communication (inter-terminal direct communication). Further, the Relay UE 1 has a capability of terminating a GTP tunnel and is configured to establish a GTP tunnel to the S-GW 7 for the Remote UE 2, which passes through its own EPS bearer (i.e., the EPS bearer between the Relay UE 1 and the P-GW 6 for the Relay UE 1), and transfer user IP packets for the Remote UE 2 (e.g., user IP packets carrying ProSe control signaling) in the established GTP tunnel. GTP tunnel packets, each encapsulating a user IP packet for the Remote UE 2, are transferred through the EPS bearer of the Relay UE 1 as described above with reference to FIGS. 7 to 9. Such a user-plane architecture (bearer structure) can contribute to, for example, the continuity of services for the Remote UE 2, like in the first embodiment.

Figure 11:
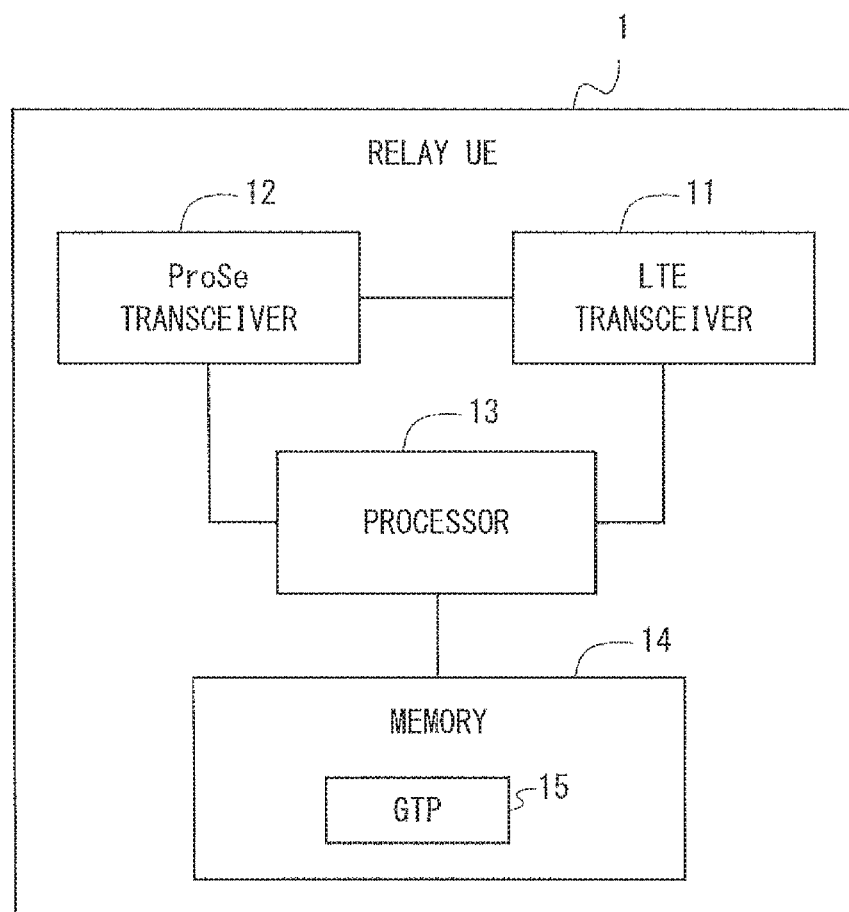
FIG. 11 is a block diagram showing a configuration example of a Relay UE.

Lastly, configuration examples of the Relay UE 1 and the P-GW 6 for the Relay UE 1 according to the first and second embodiments will be described. FIG. 11 shows a configuration example of the Relay UE 1. Referring to FIG. 11, the Relay UE 1 includes an LTE transceiver 11, a ProSe transceiver 12, a processor 13, and a memory 14. The LTE transceiver 11 is configured to communicate with the E-UTRAN (eNodeB 3). The ProSe transceiver 12 is used for ProSe direct communication (inter-terminal direct communication) with the Remote UE 2.

The processor 13 loads software (computer program) from the memory 14 and executes this software, thereby performing the operations of the Relay UE 1 as described in the above embodiments. The processor 13 may be, for example, a microprocessor, a Micro Processing Unit (MPU), or a Central Processing Unit (CPU). The processor 13 may include a plurality of processors.

The memory 14 consists of a volatile memory and a non-volatile memory. The volatile memory is, for example, a Static Random Access Memory (SRAM), a Dynamic RAM (DRAM), or a combination thereof. The non-volatile memory is, for example, a Mask Read Only Memory (MROM), a Programmable ROM (PROM), a flash memory, a hard disk drive, or a combination thereof. The memory 14 may include a storage located remotely from the processor 13. In this case, the processor 13 may access the memory 14 via an I/O interface (not shown).

In the example of FIG. 11, the memory 14 is used to store software modules including a GTP module 15. The GTP module 15 includes instructions and data necessary for establishing up a GTP tunnel to the P-GW 8 or S-GW 7 for the Remote UE 2 and for executing processing of transferring user IP packets for the Remote UE 2 through the GTP tunnel. The processor 13 loads software modules including the GTP module 15 from the memory 14 and executes these software modules, thereby performing the operations of the Relay UE 1 as described in the above embodiments.

Figure 12:
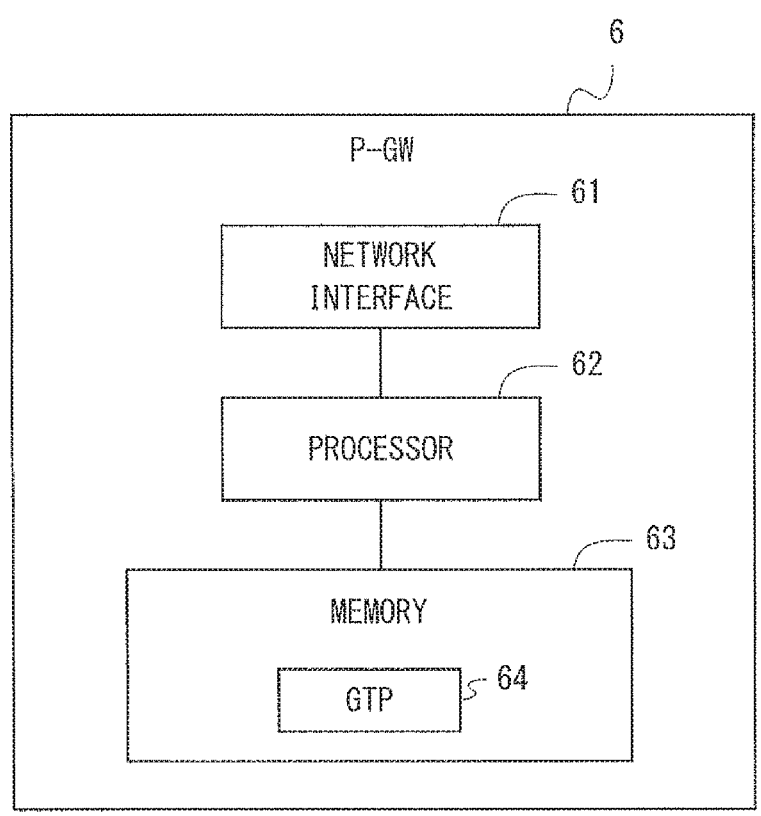
FIG. 12 is a block diagram showing a configuration example of a P-GW for a Relay UE.

FIG. 12 shows a configuration example of the P-GW 6 for the Relay UE 1. Referring to FIG. 12, the P-GW 6 includes a network interface 61, a processor 62, and a memory 63. The network interface 61 is used to communicate with network nodes (e.g., S-GW 5, P-GW 8, ProSe function entity 9, MME, and Home Subscriber Server (HSS)). The network interface 61 may include, for example, a network interface card (NIC) conforming to the IEEE 802.3 series.

The processor 62 loads software (computer program) from the memory 63 and executes this software, thereby performing the operations of the P-GW 6 as described in the above embodiments. The processor 62 may be, for example, a microprocessor, an MPU, or a CPU. The processor 62 may include a plurality of processors.

The memory 63 consists of a volatile memory and a non-volatile memory. The volatile memory is, for example, an SRAM, a DRAM, or a combination thereof. The non-volatile memory is, for example, an MROM, a PROM, a flash memory, a hard disk drive, or a combination thereof. The memory 63 may include a storage that is located physically apart from the processor 62. In this case, the processor 62 may access the memory 63 via the network interface 61 or another I/O interface (not shown).

In the example of FIG. 12, the memory 63 is used to store software modules including a GTP module 64. The GTP module 64 includes instructions and data for establishing up an S1 bearer (GTP tunnel) to the S-GW 5 and for executing processing of transmitting, in the S1 bearer, GTP tunnel packets received from the P-GW 8 or S-GW 7 for the Remote UE 2 via the SGi reference point. The processor 62 loads software modules including the GTP module 64 from the memory 63 and executes these software modules, thereby performing the operations of the P-GW 6 for the Relay UE 1 as described in the above embodiments.

As described above with reference to FIGS. 11 and 12, each of the processors included in the Relay UE 1 and the P-GW 6 according to the above-described embodiments executes one or more programs including instructions to cause a computer to perform an algorithm described with reference to the drawings. These programs can be stored and provided to a computer using various types of non-transitory computer readable media. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Compact Disc Read Only Memory), CD-R, CD-R/W, and a semiconductor memory (such as a mask ROM, a PROM (Programmable ROM), an EPROM (Erasable PROM), a flash ROM, and a RAM (Random Access Memory)). Further, these programs can be supplied to computers by using various types of transitory computer readable media. Examples of the transitory computer readable media include an electrical signal, an optical signal, and an electromagnetic wave. The transitory computer readable media can be used to supply programs to a computer through a wired communication path such as an electrical wire and an optical fiber, or a wireless communication path.

Other Embodiment

To operate as an S1 or S5 bearer endpoint, the Relay UE 1 may handle GTP-C signaling over the S11 and S5 interfaces, which is traditionally performed by an S-GW, and also handle S1-AP signaling over the S1-MME interface, which is traditionally performed by an eNodeB. Instead, new signaling may be defined for sending, to the Relay UE 1, information about the GTP tunnel (i.e., S5 or S1 bearer) endpoint at the S-GW 7 or P-GW 8 for the Remote UE 2 and for sending, to the S-GW 7 or the P-GW 8, information about the GTP tunnel endpoint at the Relay UE 1. For example, the Relay UE 1 may exchange the GTP tunnel endpoint information by exchanging Non-Access Stratum (NAS) messages with an MME.

The above-described embodiments are explained by using specific examples mainly related to the EPS. However, these embodiments may be applied to other mobile communication systems such as a Universal Mobile Telecommunications System (UMTS), a 3GPP2 CDMA2000 system (1×RTT, High Rate Packet Data (HRPD)), a Global System for Mobile communications (GSM)/General packet radio service (GPRS) system, and a mobile WiMAX system.

Further, the above-described illustrative embodiments are merely examples of applications of the technical ideas obtained by the inventor. Needless to say, these technical ideas are not limited only to the above-described embodiments and various modifications can be made thereto.

This application is based upon and claims the benefit of priority from Japanese patent application No. 2014-206189, filed on Oct. 7, 2014, the disclosure of which is incorporated herein in its entirety by reference.

REFERENCE SIGNS LIST

1 RELAY UE
2 REMOTE UE
3 eNodeB
4 EPC
5 S-GW FOR RELAY UE
6 P-GW FOR RELAY UE
7 S-GW FOR REMOTE UE
8 P-GW FOR REMOTE UE
9 ProSe FUNCTION ENTITY
30 COVERAGE (CELL)
90 PDN

The invention claimed is:

1. A method performed by a relay radio terminal, the method comprising:
   establishing a first bearer, the first bearer containing a data radio bearer between the relay radio terminal and a base station and a first General Packet Radio System Tunnelling Protocol (GTP) tunnel between the base station and a core network;
   establishing a second General Packet Radio System Tunnelling Protocol (GTP) tunnel passing through the first bearer;
   receiving or transmitting a second user packet destined for, or originating from, a remote radio terminal in the second GTP tunnel passing through the first bearer; and
   transmitting or receiving the second user packet to or from the remote radio terminal via Proximity Service (ProSe) communication, wherein
   the first bearer is established between the relay radio terminal and a first Packet Data Network Gateway (P-GW) located in the core network, and
   the second GTP tunnel is established between the relay radio terminal and a second P-GW that is different from the first P-GW.

2. The method according to claim 1, wherein said receiving or transmitting the second user packet in the second GTP tunnel passing through the first bearer comprises receiving or transmitting a first user packet through the first bearer, the first user packet containing a payload storing a GTP Protocol Data Unit (GTP PDU) that encapsulates the second user packet with a GTP header of the second GTP tunnel.

3. The method according to claim 2, wherein the first user packet containing the payload storing the GTP PDU is received or transmitted through the first bearer as a user packet for the relay radio terminal.

4. The method according to claim 2, wherein the first user packet is destined for or originates from the relay radio terminal.

5. A relay radio terminal comprising:
   at least one memory that stores a set of instructions; and
   at least one processor configured to execute the set of instructions to:
      establish a first bearer, the first bearer containing a data radio bearer between the relay radio terminal and a base station and a first General Packet Radio System Tunnelling Protocol (GTP) tunnel between the base station and a core network;
      establish a second General Packet Radio System Tunnelling Protocol (GTP) tunnel passing through the first bearer;
      receive or transmit a second user packet destined for, or originating from, a remote radio terminal in the second GTP tunnel passing through the first bearer; and
      transmit or receive the second user packet to or from the remote radio terminal via Proximity Service (ProSe) communication, wherein the first bearer is established between the relay radio terminal and a first Packet Data Network Gateway (P-GW) located in the core network, and the second GTP tunnel is established between the relay radio terminal and a second P-GW that is different from the first P-GW.

6. The relay radio terminal according to claim 5, wherein the set of instructions causes the at least one processor to receive or transmit a first user packet through the first bearer in order to receive or transmit the second user packet in the second GTP tunnel passing through the first bearer, the first user packet containing a payload storing a GTP Protocol Data Unit (GTP PDU) that encapsulates the second user packet with a GTP header of the second GTP tunnel.

7. The relay radio terminal according to claim 6, wherein the first user packet containing the payload storing the GTP PDU is received or transmitted in the first bearer as a user packet for the relay radio terminal.

8. The relay radio terminal according to claim 6, wherein the first user packet is destined for or originates from the relay radio terminal.

9. An apparatus located in a core network, the apparatus comprising:
    at least one memory that stores a set of instructions; and
    at least one processor configured to execute the set of instructions to:
        establish a first bearer between the apparatus and a relay radio terminal, the first bearer containing a first General Packet Radio System Tunnelling Protocol (GTP) tunnel; and
        transmit or receive a first user packet to or from the relay radio terminal through the first bearer, the first user packet containing a payload storing a GTP Protocol Data Unit (GTP PDU) that encapsulates a second user packet with a GTP header of a second GTP tunnel, wherein
    the second user packet is destined for, or originates from, a remote radio terminal and is transferred between the remote radio terminal and the relay radio terminal via Proximity Service (ProSe) communication,
    the first bearer is established between the relay radio terminal and the apparatus,
    the second GTP tunnel passes through the first bearer and is established between the relay radio terminal and a transfer node that is different from the apparatus, and
    each of the apparatus and the transfer node is a Packet Data Network Gateway (P-GW).

10. The apparatus according to claim 9, wherein the first user packet containing the payload storing the GTP PDU is transmitted or received through the first bearer as a user packet for the relay radio terminal.

11. The apparatus according to claim 9, wherein the first user packet is destined for or originates from the relay radio terminal.

12. The apparatus according to claim 9, wherein the set of instructions causes the at least one processor to transmit or receive a data packet through the first GTP tunnel in order to transmit or receive the first user packet to or from the relay radio terminal, the data packet containing a payload storing a GTP PDU that encapsulates the first user packet with a GTP header of the first GTP tunnel.

* * * * *